(No Model.) 2 Sheets—Sheet 1.
O. Y. FRYKHOLM.
HYDROSTATIC LEVELING INSTRUMENT.
No. 505,269. Patented Sept. 19, 1893.
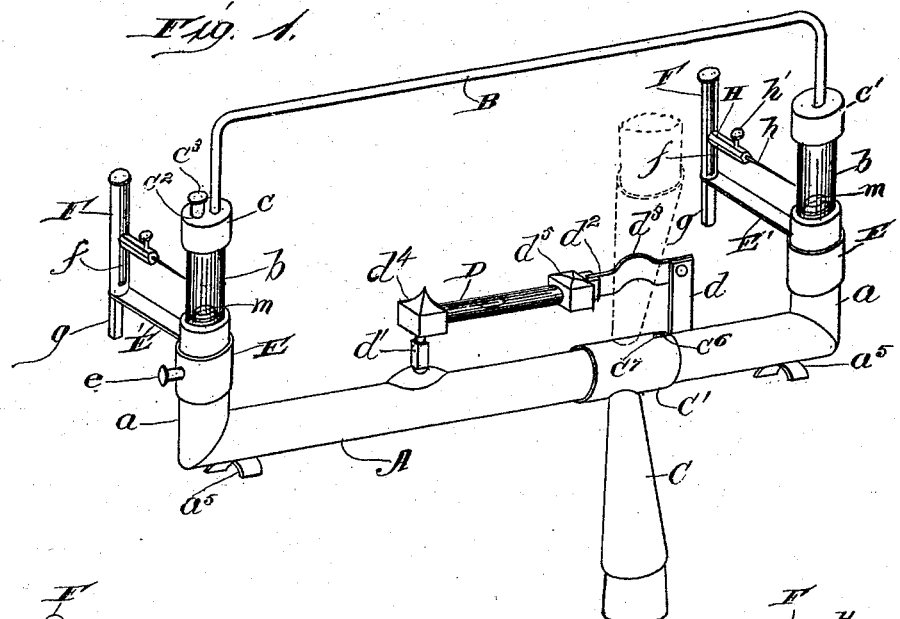
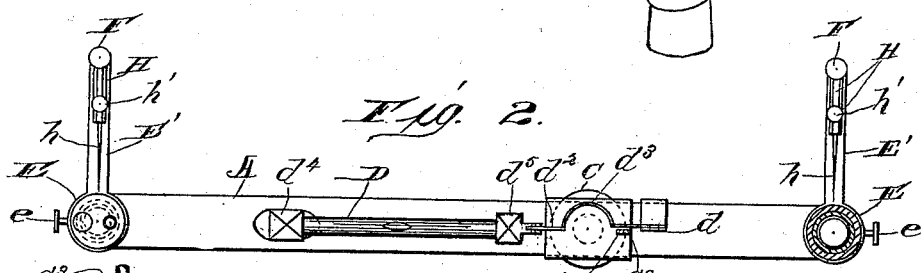
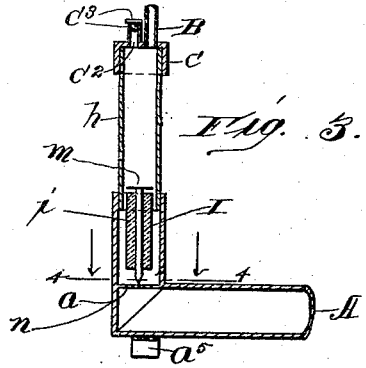
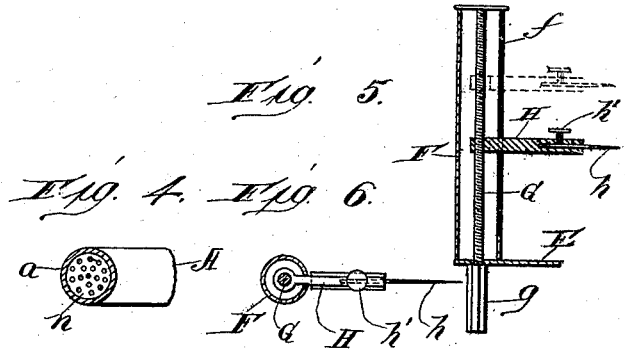
Witnesses:
Chas. E. Gorton.
C. A. Duggan.
Inventor:
Olof Y. Frykholm.
By Chas. C. Tillman
Atty.

(No Model.) 2 Sheets—Sheet 2.
O. Y. FRYKHOLM.
HYDROSTATIC LEVELING INSTRUMENT.
No. 505,269. Patented Sept. 19, 1893.
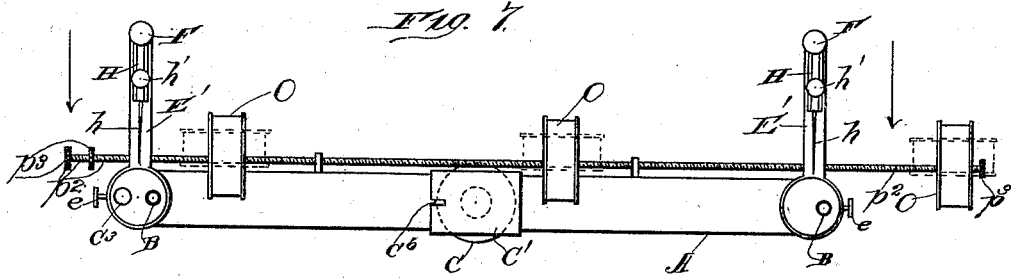
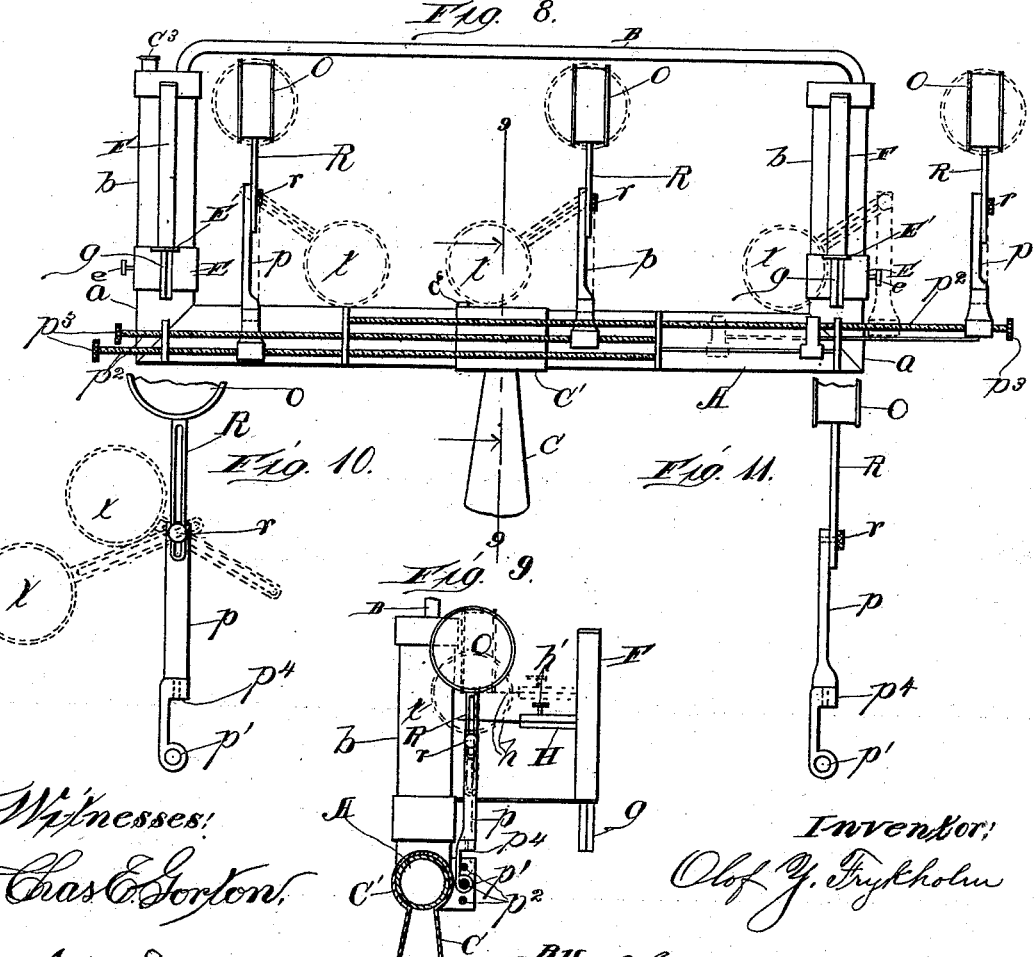
Witnesses:
Chas. E. Gorton
E. A. Duggan
Inventor:
Olof Y. Frykholm
By Chas. C. Tillman
Atty

UNITED STATES PATENT OFFICE.

OLOF YHAN FRYKHOLM, OF AUSTIN, ILLINOIS.

HYDROSTATIC LEVELING-INSTRUMENT.

SPECIFICATION forming part of Letters Patent No. 505,269, dated September 19, 1893.

Application filed May 5, 1893. Serial No. 473,100. (No model.)

*To all whom it may concern:*

Be it known that I, OLOF YHAN FRYKHOLM, a citizen of the United States, residing at Austin, in the county of Cook and State of Illinois, have invented certain new and useful Improvements in Hydrostatic Leveling-Instruments, of which the following is a specification.

This invention relates to improvements in leveling instruments and especially to that class in which a liquid or spirits inclosed in a tube is used as an indicating medium; and it consists in certain peculiarities of the construction, novel arrangement and operation of the various parts thereof, as will be hereinafter more fully set forth and specifically claimed.

The object of my invention is to afford a simple, cheap, and practical, as well as accurate instrument, that will combine a level and grading gage.

In order to enable others skilled in the art, to which my invention pertains to make and use the same, I will now proceed to describe it, referring to the accompanying drawings, in which—

Figure 1, is a perspective view of my instrument. Fig. 2, is a plan view thereof, partly in section. Fig. 3, is a vertical sectional view of a portion of the liquid tube and its float or indicator. Fig. 4, is a sectional view, taken on line 4, 4, of Fig. 3. Fig. 5, is an enlarged detail sectional view of one of the adjustable needle sights detached from the instrument. Fig. 6, is a plan sectional view thereof. Fig. 7, is a plan view of the instrument, showing the adjustable specular glasses attached thereto. Fig. 8, is a view in side elevation of Fig. 7, looking in the direction of the arrows, and showing the specular or sight glasses in position for use, by continuous lines, and some of their adjustable positions, by dotted lines. Fig. 9, is a sectional view, taken on line 9, 9, of Fig. 8. Fig. 10, is a detail view of one of the sight or specular glasses and its adjustable standard detached from the instrument, and Fig. 11, is a similar view thereof, with the glasses turned in another direction.

Similar letters refer to like parts throughout the different views of the drawings.

A, represents the tube, made of any suitable size, form, and material, but preferably cylindrical in shape, and of metal, and having at each end an upturned portion or elbow $a$, upon which is fitted a glass-tube $b$, through which the liquid or spirits and float may be seen. The upper end of the glass-tubes $b$, are provided with caps $c$, and $c'$, which are united by means of another tube B, which passes slightly through at each of its ends, the caps $c$, and $c'$, into the glass tube $b$, and is for the purpose of allowing the air confined in the tubes to pass from one to the other. The cap $c$, is also provided with an opening $c^2$, in its top, for the admission of the liquid or spirits, and is closed by means of a stopper $c^3$.

To the upper surface of the tube A, and at suitable points between the elbows $a$, thereof, are secured standards or upright pieces $d$, and $d'$, the first of which has secured to its upper end a horizontal bar or piece $d^2$, which is slightly bowed or curved, as shown in Fig. 1, at $d^3$, to receive the socket-piece C, when it is not in use.

To the upper end of the standard $d'$, is secured a nut $d^4$, to which is fastened one end of the tube D, which is partly filled with liquid or spirits, and has its other end secured to a nut or piece $d^5$, on the inner end of the arm $d^2$. The tube D, acts as an ordinary spirit-level, and is for ascertaining the level of planes or horizontal surfaces in the usual manner.

To each of the upturned parts $a$, or elbows, is secured by means of a set or thumb-screw $e$, a collar E, which fits around said elbows, and are provided with horizontally extending arms E', to the upper ends of which are secured split-tubes F, which have secured therein, screw-threaded bolts G, the lower ends of which are provided with a thumb-piece $g$, for turning the same.

Passing through the split or slot $f$, of the tubes F, and engaging with the screw-threaded rods G, are the needle holders or pieces H, in the other ends of which are inserted needle-points $h$, which are secured in the pieces H, by means of a set-screw $h'$, which allows the needle to be retracted or extended as desired. It will be seen and understood, that by turning the thumb-piece $g$, of either of the tubes F, the screw-threaded rod G, will cause the piece or needle point to rise or fall and to indicate on the tubes $b$, the position of the liquid or floats therein, which floats I, are preferably made of a piece of cork $i$, or other suitable light material, having inserted longitudinally through their centers a quill or closed tube $m$, in order to render the float lighter.

The lower portion of the elbows or upturned portions $a$, are provided with perforated screens or disks $n$, which will prevent the floats sinking too far in the tubes, yet will permit the free flow of the liquid or spirits.

To the tube A, and preferably between the standards $d$, and $d'$, is secured by means of a collar $C'$, which fits around said tube, a socket-piece C, which is adapted to fit on the end of a staff, when the level is to be used for grading purposes.

As shown in Fig. 1 of the drawings, the collar $C'$, is provided with a slot $c^6$, which will engage with a projection on the tube A, and retain the socket-piece C, in a vertical position. When it is desired to use the instrument for leveling planes or horizontal surfaces, the socket-piece C, may be turned to the position indicated by dotted lines in Fig. 1, when it will fit within the curved portion $d^3$, of the arm $d^2$, and the slot $c^6$, will engage with a suitable projection (not shown) on the lower surface of the tube A, and when the legs or projections $a^5$, on the lower surface of the said tube will keep the instrument in a vertical position.

From the above description it will be seen and understood, that the liquid within the tube A, will be displayed through the glass tube $b$, and that the floats I, will make the same more visible to the eye, and that the needle-sights $h$, may be adjusted vertically or around the tubes.

In Figs. 7, and 8, I have shown my instrument with sighting or specular glasses O, adjustably secured thereto, and for the convenience of illustration have omitted certain features, such as the tube D, and floats which are shown in the other views, and which may or may not be used when the sighting glasses are employed, as is desired. The glasses O, are mounted upon standards $p$, which are provided at their lower ends with screw-threaded openings $p'$, to engage screw-threaded adjusting rods $p^2$, which are suitably secured to the side or sides of the tube A, and extend longitudinally therewith, and a slight distance beyond the elbows $a$, and are provided at their outer ends with thumb-pieces $p^3$, to permit them to be easily turned. The lower portions of the standards $p$, are formed with a swivel-joint $p^4$, in order to allow the glasses to be turned in any direction. To the upper portions of the standards, is secured by means of set-screws $r$, a slotted arm R, to the upper end of which the glasses O, are affixed. These set-screws passing through the slot in the arm R, permit the glasses to be raised or lowered or adjusted laterally, if desired, as is fully shown by the position of the glasses indicated by dotted lines in Figs. 8, and 10.

When it is desired to place the instrument in a box or case for safe-keeping, the glasses may be turned on their swivel-joints and bent down to the position indicated by dotted lines, as at $t$, in Fig. 8, of the drawings. It is also apparent that by turning the screw-threaded rods $p^2$, the glasses may be adjusted longitudinally with the tube A, and by means of the set or thumb-screws $r$, and the slotted arm R, may be adjusted both vertically and laterally, until they are in proper position for the needle-points. By the use of these specular glasses, which may be either telescopic or microscopic, it is obvious that more accuracy will be attained, in view of the fact that the objective point can be seen at a much greater distance, than with the naked eye.

Having thus fully described my invention, what I claim as new, and desire to secure by Letters Patent, is—

1. In a leveling instrument, the combination of the tube A, having the upturned portions $a$, at its ends, with the transparent tubes $b$, secured thereto, and having the caps $c$, and $c'$, the cap $c$, having the opening $c^2$, provided with a stopper $c^3$, for the admission of the liquid or spirits, the tube B, connecting the tubes $b$, the floats I, composed of the pieces $i$, and quills $m$, and located within the upturned portions $a$, and adapted to rise in the tubes $b$, the movable socket-piece C, secured to the tube A, all constructed, arranged and operating, substantially as and for the purpose set forth.

2. In a leveling instrument, the combination of the tube A, having the elbows $a$, and the perforated disks $n$, with the transparent tubes $b$, secured in said elbows, and having the caps $c$, and $c'$, the cap $c$, having the opening $c^2$, provided with a stopper $c^3$, for the admission of the liquid or spirits, the tube B, connecting the tubes $b$, the floats I, composed of the pieces $i$, and quills $m$, and located within the elbows $a$, and adapted to rise in the tubes $b$, the movable socket-piece C, having the collar $C'$, provided with the slot $c$, to fit around the tube A, and the tube D, secured to the tube A, all constructed, arranged and operating substantially as and for the purpose set forth.

3. In a leveling instrument, the combination of the tube A, having the elbows $a$, and perforated disks $n$, with the transparent tubes $b$, secured to said elbows, and having the caps $c$, and $c'$, the cap $c$ having the opening $c^2$, provided with a stopper $c^3$, for the admission of the liquid or spirits, the tube B, connecting the tubes $b$, the floats I, located within the elbows $a$, and adapted to rise in the tubes $b$, the movable socket-piece C, having the collar $C'$, to fit around the tube A, and provided with a slot $c^6$, to engage a projection $c^7$, to hold the socket-piece rigidly, and the adjustable needle-sights secured at each end of the level, all constructed, arranged, and operating substantially as and for the purpose set forth.

4. In a leveling instrument, the combination of the tube A, with the transparent tubes b, secured thereto, an indicating substance within said tubes, the adjustable needle-sights secured to each end of the level and the adjustable specular glasses movably secured to the tube A, substantially as described.

OLOF YHAN FRYKHOLM.

Witnesses:
CHAS. C. TILLMAN,
FRED. V. FRYKHOLM.